(12) United States Patent
Yüksel et al.

(10) Patent No.: US 11,987,103 B2
(45) Date of Patent: May 21, 2024

(54) SEALING PROFILE

(71) Applicant: STANDARD PROFIL OTOMOTIV SANAYI VE TICARET A. S., Istanbul (TR)

(72) Inventors: Hakki Tuncay Yüksel, Düzce (TR); Mevlüt Çetin, Düzce (TR); Yusuf Çöz, Düzce (TR); Thierry Duchet, Düzce (TR); Leo Huang, Düzce (TR)

( * ) Notice: Subject to any disclaimer, the term of this patent is extended or adjusted under 35 U.S.C. 154(b) by 6 days.

(21) Appl. No.: 17/603,162

(22) PCT Filed: Nov. 3, 2020

(86) PCT No.: PCT/TR2020/051034
§ 371 (c)(1),
(2) Date: Oct. 12, 2021

(87) PCT Pub. No.: WO2022/019849
PCT Pub. Date: Jan. 27, 2022

(65) Prior Publication Data
US 2022/0297518 A1   Sep. 22, 2022

(51) Int. Cl.
*B60J 10/79* (2016.01)
*F16J 15/3232* (2016.01)

(52) U.S. Cl.
CPC ......... *B60J 10/79* (2016.02); *F16J 15/3232* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/3216; F16J 15/322; F16J 15/3224; F16J 15/3232; F16J 15/3236; B60J 10/00; B60J 10/70; B60J 10/74–76; B60J 10/763; B60J 10/767; B60J 10/77; B60J 10/79
USPC ......................................................... 277/562
See application file for complete search history.

(56) References Cited

U.S. PATENT DOCUMENTS

| | | |
|---|---|---|
| 4,490,942 A | 1/1985 | Arnheim et al. |
| 2007/0175100 A1 | 8/2007 | Brancaleone et al. |
| 2010/0199568 A1* | 8/2010 | Kondo ..................... B60J 10/76 29/527.1 |
| 2012/0091751 A1 | 4/2012 | Immer |
| 2017/0001505 A1 | 1/2017 | Fukuta |
| 2018/0141421 A1* | 5/2018 | Blottiau ................... B60J 10/17 |
| 2018/0186225 A1* | 7/2018 | Charge ..................... B60J 10/79 |

FOREIGN PATENT DOCUMENTS

EP   2102448 A1   12/2016

OTHER PUBLICATIONS

International Search Report and Written Opinion of the International Searching Authority for corresponding PCT/TR2020/051034, dated Jun. 8, 2021.

\* cited by examiner

*Primary Examiner* — Nathan Cumar
(74) *Attorney, Agent, or Firm* — Egbert, McDaniel & Swartz, PLLC

(57) ABSTRACT

A sealing profile providing dust and water insulation for use in the side glasses of motor vehicles.

9 Claims, 5 Drawing Sheets

SEALING PROFILE

TECHNICAL FIELD

The invention relates to a flush/smooth sealing profile with the purpose of being used in the side glasses of motor vehicles.

STATE OF THE ART

Today, many flush/smooth sealing structures exist in the motor vehicles sector. These structures, which possess significant advantages in terms of style and NVH performance, additionally provide an impressive look as well. Many companies in the market have different solutions with regards to the design of the said structures. In the flush/smooth sealing structures which are being used in the technical field, it is fundamentally purposed that the motor vehicle glass is prevented to move especially in the x and y axes. General views of the sealing structures, which have been subject of different patent applications regarding the state of art, are shown in U.S. Pat. No. 6,880,293, U.S. Patent Application No. 2006/0037249, U.S. Patent Application No. 2006/0021282, International Publication No. WO201491812, European Patent No. 3356170 and Chinese Patent No. 107548364. In discordance with the current implementations, they do not include any coat or cover edge to establish a flush/smooth surface form. However, when the performed developments are reviewed, embodiments with highly complex forms gather attention. These complex embodiments create disadvantages regarding implementation difficulties such as tolerance management as well as disadvantages in terms of cost and production. Therefore, these implementations are generally seen in upper class vehicles.

In the patent and literature research performed with regards to the current state of art, American patent application with publication number U.S. Pat. No. 4,490,942 A is found. The said document relates to a window panel into which the guide pieces and glass sealing tools are put, and which can be arranged vertically for the purpose of being used in a door of the motor vehicle. Nonetheless, in the document, there is no explanation with regards to the existence of a hook and a connection in the injection transition regions for the purpose of fixing the glass specifically in the x direction. On the other hand, a document with publication number US2007175100 A1 in the same technical field relates to a glass mounting assembly for vehicle doors. In the document, a plate, and a bracket, which include an element for the movement of the glass and holding it stable, are mentioned. However, in the document, there is no explanation with regards to the existence of a hook and a connection in the injection transition regions for the purpose of fixing the glass specifically in the x direction.

Consequently, as mentioned above, various problems and disadvantages are experienced in the relevant technical field and current applications are insufficient to solve these problems and disadvantages. This makes it necessary to make a development and innovation in the technical field.

PURPOSE OF THE INVENTION

The present invention relates to a sealing profile that meets the need mentioned above, while eliminating all disadvantages and providing some additional advantages.

The main purpose of the invention is to provide a structure which provides sealing in a much simpler and effective manner on contrary to the complex sealing implementations which exist in the current state of art. In the sealing profile of the invention, dust and liquid leakage is prevented by the virtue of using a hook and the pillar structures and a product with high sealing property is provided.

The structural and characteristic features and all advantages of the invention will be understood more clearly through the detailed explanation written with the following figures and references to these figures, and therefore assessment should be made by considering these figures and detailed explanation.

BRIEF DESCRIPTION OF DRAWINGS

For understanding of present invention as well as its embodiments in the best manner, an evaluation shall be made by taking the figures of which the explanations are given below into account.

DESCRIPTION OF REFERENCES

Figure 1:
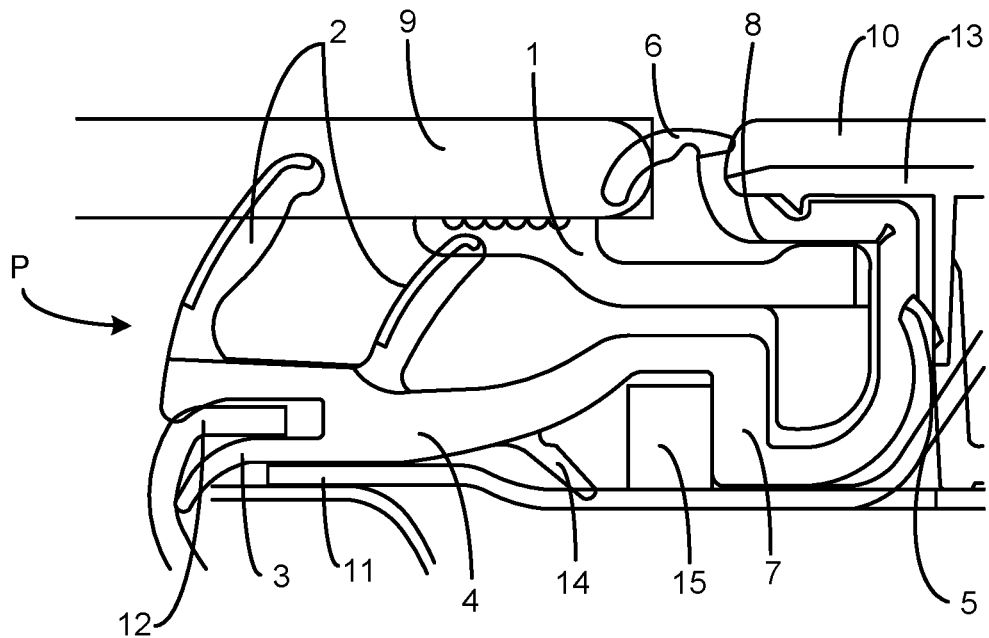
FIG. 1 shows the general view of sealing profile of the present invention.
Figure 2:
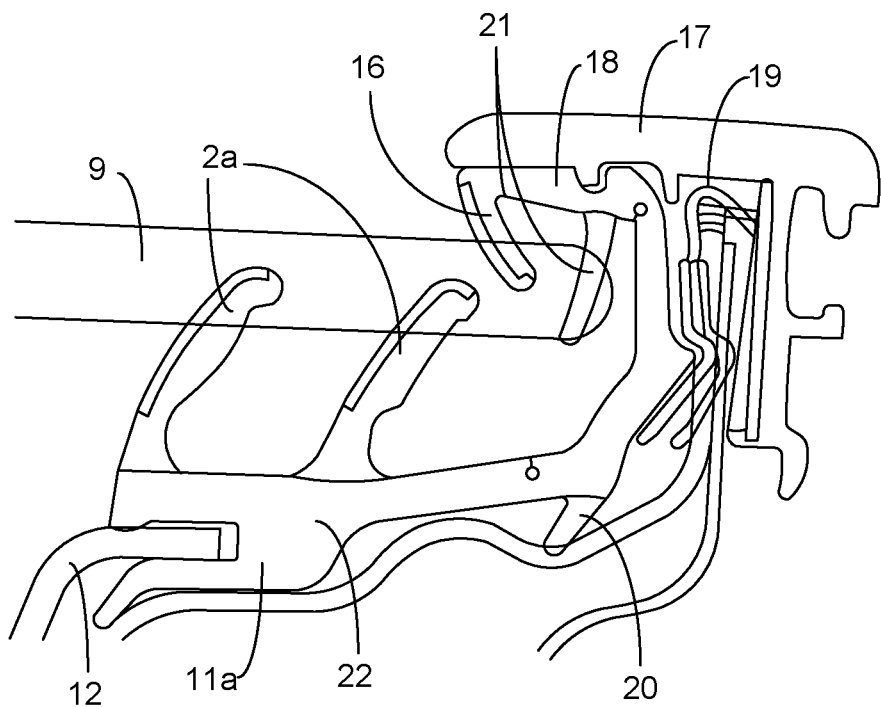
FIG. 2 shows the general view of another embodiment of the sealing profile of the invention.
Figure 3:
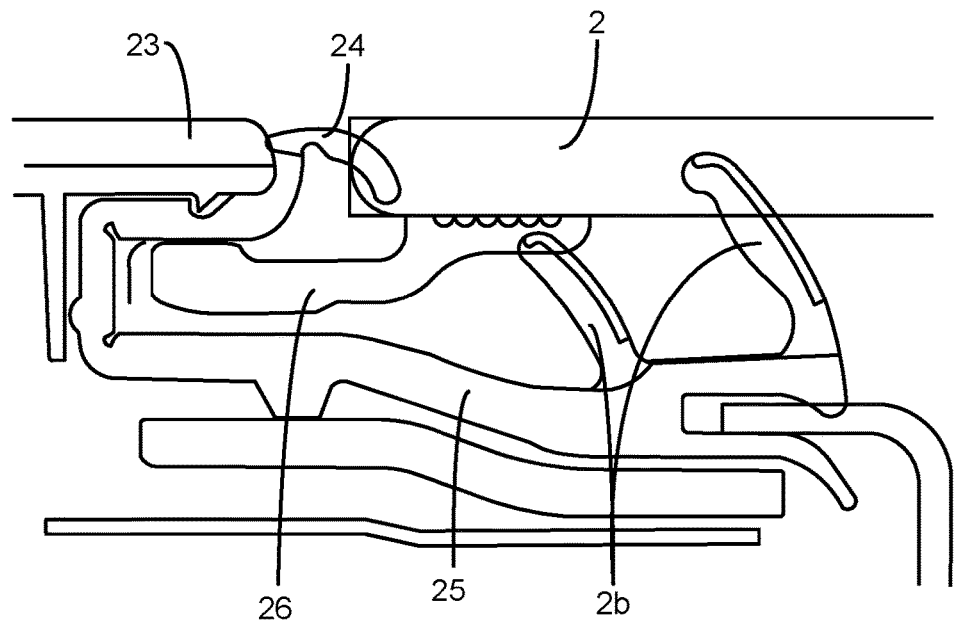
FIG. 3 shows the general view of another embodiment of the sealing profile of the present invention.
Figure 4:
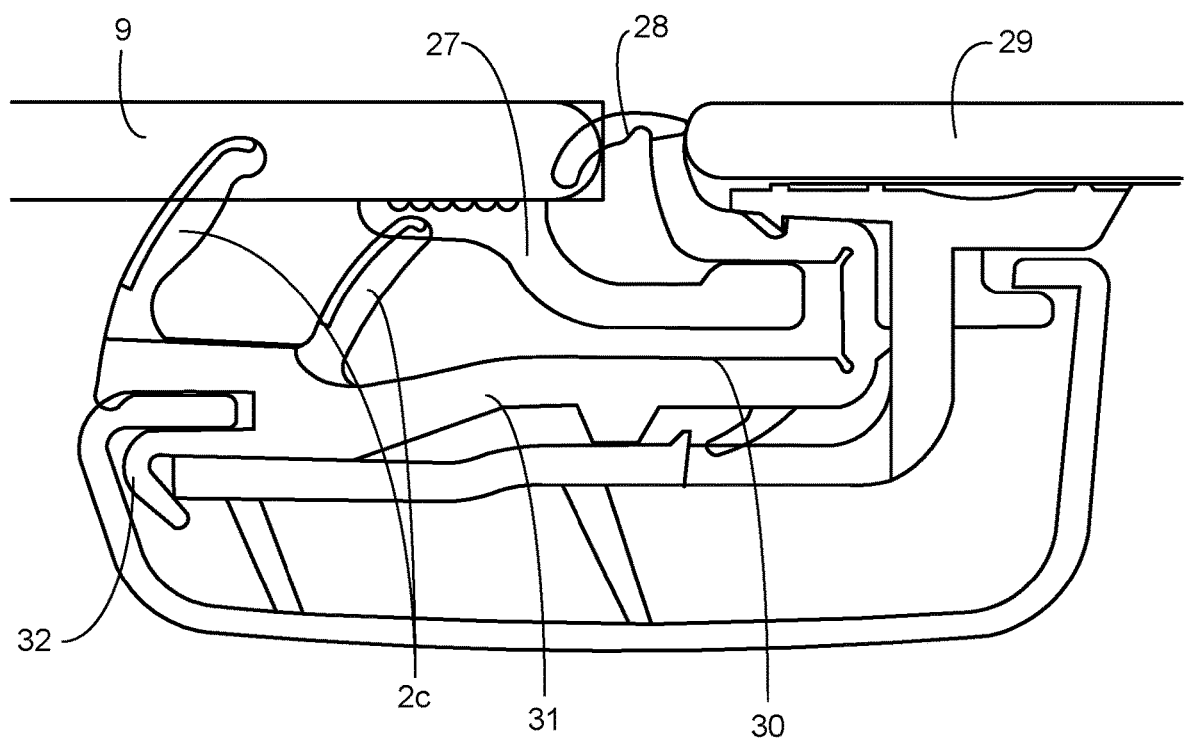
FIG. 4 shows the general view of another embodiment of the sealing profile of the present invention.
Figure 5:
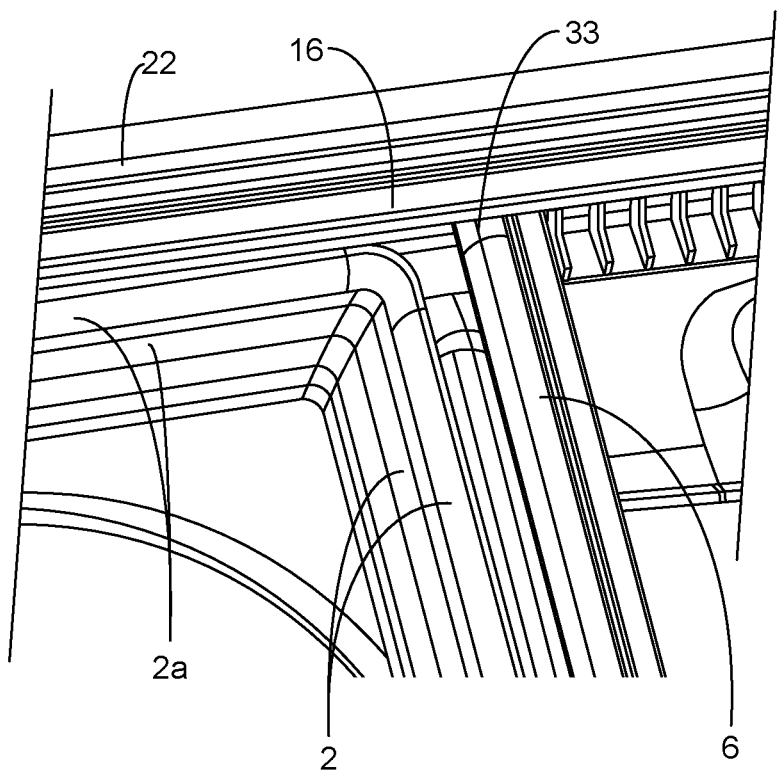
FIG. 5 shows the general view of another embodiment of the sealing profile of the present invention.
Figure 6:
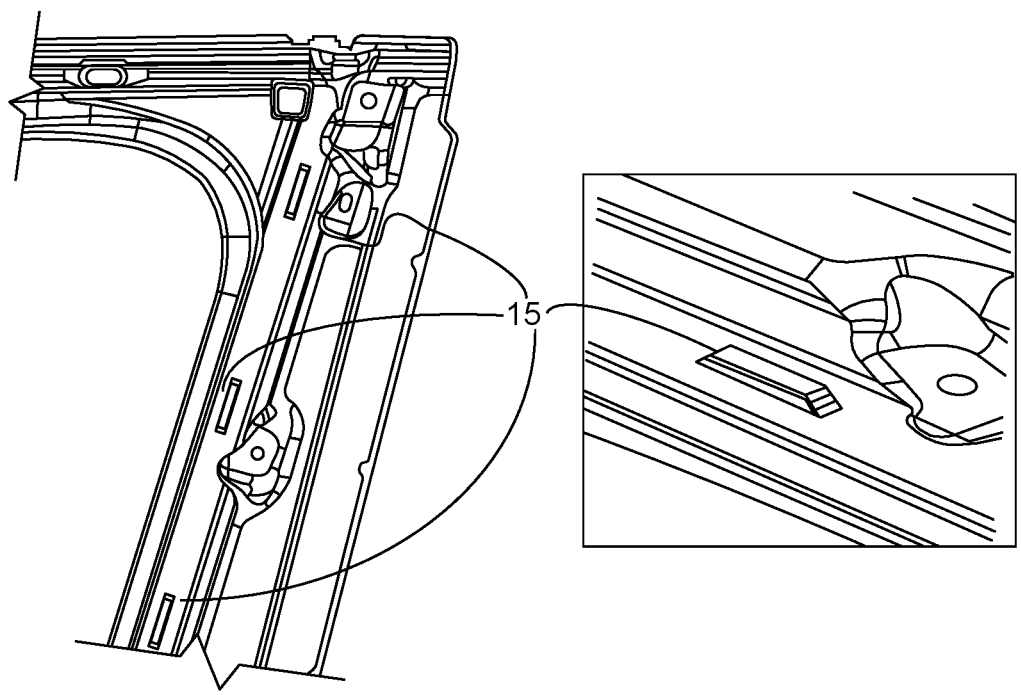
FIG. 6 show the general view of hook figure.
Figure 7:
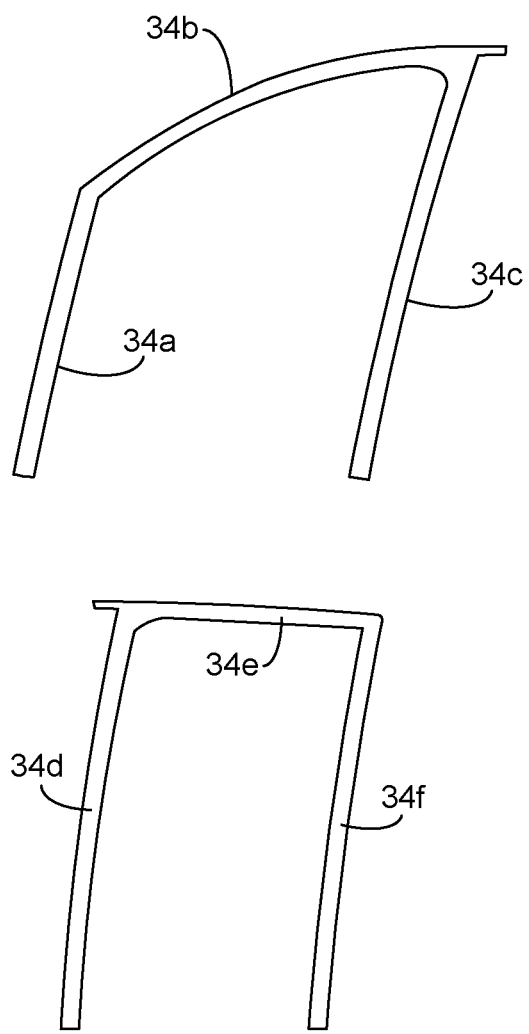
FIG. 7 shows the general view of the pillar sealings.

P. Profile
1. Glass guide
2. Glass Positioning Lips
   2a Roof Glass Positioning Lips
   2b B Pillar Glass Positioning Lips
   2c C Pillar Glass Positioning Lips
3. Inner Isolation Lip
4. Profile body
5. Bottom foot lip
6. External Flush Lip
7. Base Groove Lip
8. Slip Coat Side Base
9. Glass
10. Capping/cover outer surface
11. Channel flange
    11a Roof (cap sealing) body
12. Plastic trim part
13. Capping/cover inner
14. Lip
15. Hook figure
16. Header seal outer lip
17. Bright trim
18. Bright part groove
19. Metallic clip
20. Retention lip
21. Header seal bottom lip
22. Header seal body
23. A pillar capping
24. A pillar outer lip
25. A pillar body
26. A pillar glass guide 27. C pillar glass guide
28. C pillar outer lip
29. C pillar quarter glass
30. C pillar seal TPV coating
31. C pillar seal body
32. C pillar seal isolation lip
33. B pillar injection
   34a A pillar sealing
   34b Front door roof sealing
   34c Front B pillar section
   34d Rear B pillar section
   34e Rear roof sealing
   34f C Pillar sealing

DETAILED DESCRIPTION OF THE INVENTION

In the herein detailed description, the preferred configurations of the sealing profile of the invention are described only for a better understanding of the subject matter without posing any limitations.

The invention relates to a sealing profile (P) for the purpose of being used in motor vehicles. General view of the said sealing profile (P) is given in FIG. 1. In motor vehicles, glasses generally are located on a panel and/or door in fixed or movable form in the rear of the vehicle. Glass guide (1) is the part guiding the movement of the said side glasses (9) in the vertical direction and are located onto the profile (P) in which the glass (9) moves. Material of the glass guide (1) is significant in terms of the durability/sustainability. All parts of the said profile (P) are held together by the virtue of the profile body (4). The glass positioning lips (2) is responsible for positioning the glasses (9) and it provides insulation against water, dust, and noise. In addition; roof glass positioning lips (2a) in the roof section, B pillar glass positioning lips (2b) in the B pillar section and C pillar glass positioning lips (2c) in the C pillar section is responsible for insulation against water, dust and noise.

An inner isolation lip (3) is located between the inner channel flange (11) of the door, in which the glass (9) is located, and the plastic trim part (12). The said inner isolation lip (3) preferably has a long and thin form and serves as a damping element between the inner channel flange (11) and the plastic trim part (12). The said channel flange (11) is the part welded onto the door. On the other hand, the plastic trim part (12) is the inner trim connected to the said profile (P).

Figure 8:
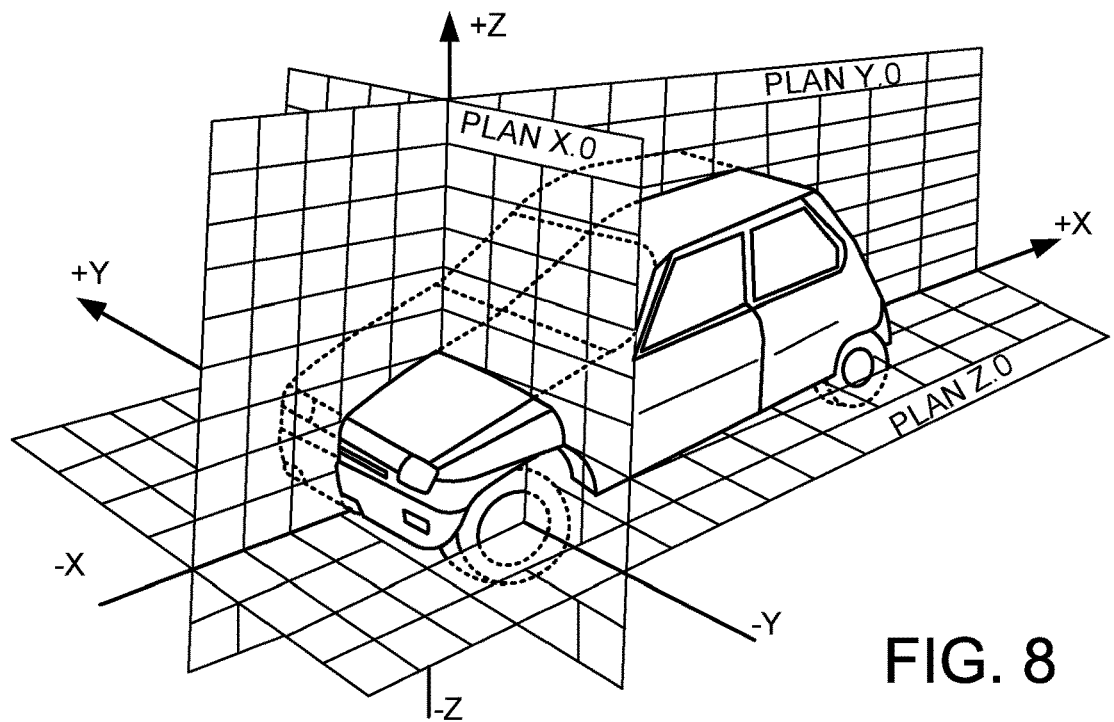
FIG. 8 shows axis directions of the vehicle.
Figure 9:
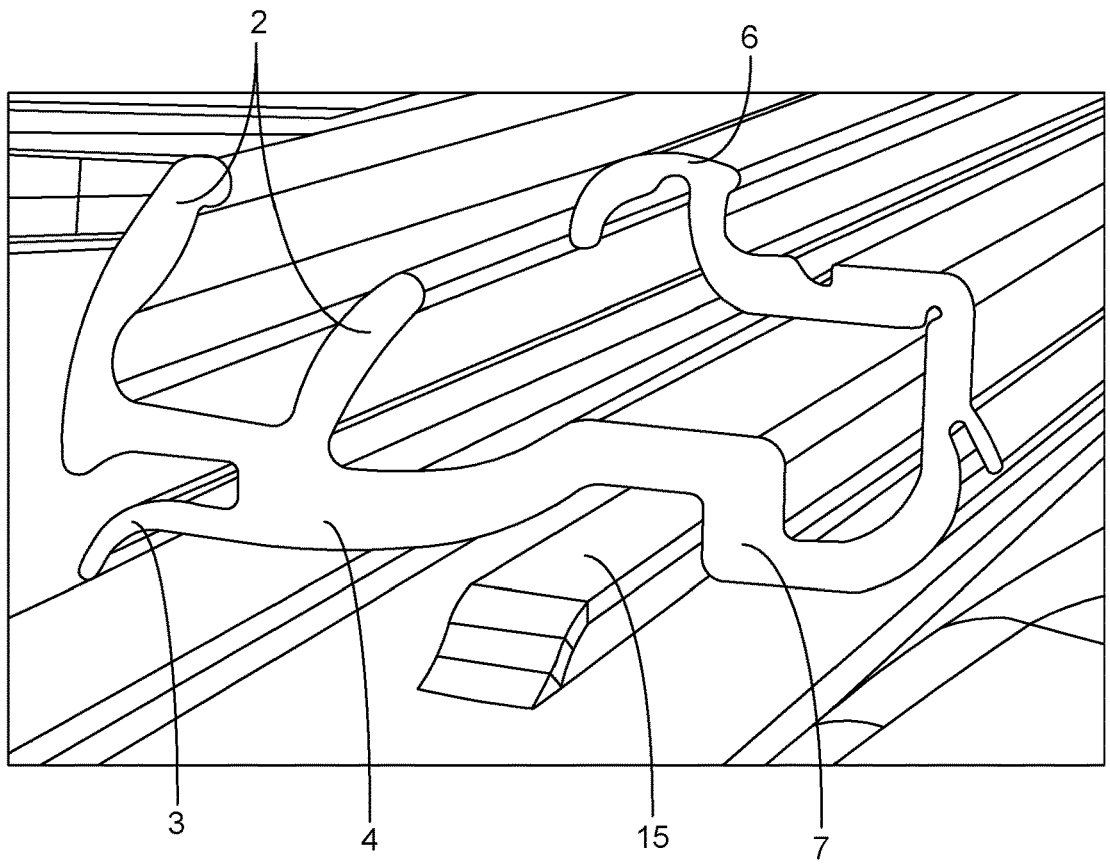
FIG. 9 is a three-dimensional view of the sealing profile of the present invention.

At least one bottom foot lip (5), which is included in the profile (P) structuring, enables the profile (P) to be held in the channel in which the glass (9) is located. By this manner, the bottom foot lip (5) positions the profile (P) in X and Y axes. Vehicle axis directions are given in FIG. 8. According to this, X direction defines the movement direction of the vehicle, Y defines the horizontal direction perpendicular to X direction and Z defines the vertical direction.

The external flush lip (6) included in the said sealing profile (P) enables the continuity between the capping/cover outer surface (10) and the glass (9). By this manner, the sealing property is guaranteed and the said external flush lip (6) acts as a barrier between the inner and outer environments of the vehicle. The external flush lip (6) provides continuity between the capping/cover outer surface (10), capping inner surface (13) and glass (9). The external flush lip acts as a barrier between the inner and outer environments of the vehicle.

At least one base groove lip (7) is included in the profile (P) structure of the invention. The said Base Groove Lip (7), due to its grooved form, acts as a reference for positioning the profile (P) and enables the positioning of the external flush lip (6) with respect to the capping/cover outer surface (10).

Slip coat side base (8) is a TPV slip coat region which is structured for the purpose of providing long term performance during the sliding movement of the glass (9). The said region is coated with TPV (Thermoplastic Volcanizate) material with sliding properties for the purpose of providing endurance against abrasion during the movement of the glass (9).

In the invention, at least one lip (14) is structured for the purpose of providing acoustic performance and creating noise insulation. The capping/cover outer surface (10) is the visual part covering the outer surface. The capping/cover inner (13) is the part holding the capping/cover outer surface (10) in vehicle position.

Holding the glass (9) in X direction is provided by at least one hook FIG. 15). In addition, bright trim (17), of which the outer surface is coated with chromium, also plays a significant role for the glass (9) to maintain its correct position. Maintaining the said bright trim (17) on the channel flange (11) is provided by the metallic clip (19).

The said profile (P) includes at least one bright part groove (18) for the purpose of maintaining/holding the header section (header section) in the correct position. Here, the said header section (header section), is in the roof area of the glass (9) channel group. A pillar capping (23) constitutes the header section (header section) and the front glass (9) channel sealing as a B pillar sealing.

For the header section, at least one retention lip (20) is also structured in the profile (P). The header seal outer lip (16) is covered with wool (flock) and prevents the entrance of dust and water. The header seal bottom lip (21) provides sealing for the glass (9) edge on the vehicle roof. All parts of the header section are gathered on a header seal body (22).

The said profile (P) includes at least one A pillar capping (23) for the purpose of maintaining/holding the A pillar section in the correct position. In addition, at least one A pillar outer lip (24) is also included in the profile (P) structure for the purposes of preventing the entrance of dust and water as well as balancing the final position. The said A pillar outer lip (24) has a coating.

In the invention, at least one A pillar glass guide (26) is structured for the purpose of guiding the vertical movements of the glasses (9) and is positioned onto the profile in which the glass (9) moves. All parts of the A pillar section are gathered on an A pillar body (25).

In the invention, A pillar capping (23), by the virtue of the A pillar glass guide (26), enables the glass to be fixed in Y direction and prevents a level difference (flush) between the glass (9) and the cap in this area.

In the invention, at least one C pillar glass guide (27) is structured for the purpose of guiding the vertical movements of the glasses (9) and is positioned onto the profile (P) in which the glass (9) moves. For providing the said vertical movement, at least one C pillar seal TPV coating (30) is also located on the C pillar. Also, at least one C pillar outer lip (28) is included for the purpose of preventing the entrance of dust and water. The said C pillar outer lip (28) has a coating.

At least one C pillar seal isolation lip (32) is located between the inner channel flange (11) and the plastic trim part (12) for the purpose of serving as a damping element. The said C pillar seal isolation lip (32) preferably has a long and thin form. All parts of the C pillar section are gathered on a C pillar seal body (31).

B pillar injection (33) in the invention provides a connection between the B pillar sealing and the roof sealing with the purpose of improving water, dust, and air insulation performance.

A pillar sealing (34a) in the invention are used to be positioned into A pillar GRC (Glass Run Channel) channel. Similarly, front door roof sealing (34b) is positioned into the roof GRC channel, front B pillar section (34c) is positioned into the B pillar GRC channel, rear B pillar section (34d) is positioned into B pillar GRC channel, rear roof sealing (34e) is positioned into roof GRC channel and C pillar sealing (34f) is positioned into bar channel.

The invention claimed is:

1. A sealing profile for use in a motor vehicle, the sealing profile comprising:
   a glass panel;
   at least one glass guide that guides a vertical movement of said, glass panel in the motor vehicle;
   at least one hook figure that holds said glass panel in an X direction;
   an external flush lip continuous between a capping/cover outer surface and a capping/cover inner Ona ace and said glass panel, said external flush lip adapted to act as a barrier between an inner environment and an outer environment of the motor vehicle in order to provide sealing; and
   a base groove lip positioning said external flush lip with respect to the capping/cover outer surface, wherein said base groove lip acts as a reference by a groove therein, wherein the capping/cover inner surface holds the capping cover outer surface, the capping/cover outer surface defining a visual part covering an outer surface of the motor vehicle.

2. The sealing profile of claim 1, further comprising:
   a plurality of glass positioning lips positioning said glass panel into the motor vehicle, said plurality of glass positioning lips adapted to insulate against dust and water intrusion into the motor vehicle.

3. The sealing profile of claim 2, further comprising:
   a roof glass positioning, lip positioned in a roof of the motor vehicle and adapted to provide water, dust and noise insulation.

4. The sealing profile of claim 2, further comprising:
   a plurality of B pillar positioning lips positioned in a B pillar of the motor vehicle, and adapted to provide water, dust and noise insulation.

5. The sealing profile of claim 2, further comprising:
   a plurality of C pillar positioning lips positioned in C pillar of the motor vehicle and adapted to provide water, dust and noise insulation.

6. The sealing profile of claim 1, further comprising:
   at least one bottom foot lip holding said glass panel in a channel.

7. The sealing profile of claim 1, further comprising:
   at least one slip coat side base cooperative with said glass panel and adapted to ease a sliding movement of said glass panel.

8. The sealing profile of claim 7, wherein said slip coat side base is coated with a TPV material.

9. The sealing profile of claim 1, further comprising:
   an A pillar capping that enables the glass panel to be fixed in a Y direction and causes the glass panel to be flush with said A pillar capping.

* * * * *